US011025469B2

(12) United States Patent
Barghi et al.

(10) Patent No.: US 11,025,469 B2
(45) Date of Patent: Jun. 1, 2021

(54) MODULATED SIGNATURE ADDED FOR ENHANCED AUTHENTICATION AND INTEGRITY LINK

(71) Applicant: NXP USA, INC., Austin, TX (US)

(72) Inventors: Frederic Georges-Ferdinand Barghi, Le Rouret (FR); Julien Olivain, Grasse (FR); Olivier Jean, Roquefort les Pins (FR)

(73) Assignee: NXP USA, Inc., Austin, TX (US)

(*) Notice: Subject to any disclaimer, the term of this patent is extended or adjusted under 35 U.S.C. 154(b) by 0 days.

(21) Appl. No.: 16/939,701

(22) Filed: Jul. 27, 2020

(65) Prior Publication Data

US 2021/0051053 A1 Feb. 18, 2021

(30) Foreign Application Priority Data

Aug. 15, 2019 (EP) .................................... 19306018

(51) Int. Cl.
*H04L 27/26* (2006.01)
*H04L 5/00* (2006.01)
(Continued)

(52) U.S. Cl.
CPC ........ *H04L 27/2628* (2013.01); *H04L 5/0007* (2013.01); *H04L 9/0643* (2013.01); *H04L 25/03929* (2013.01)

(58) Field of Classification Search
CPC ........... H04L 25/03929; H04L 27/2628; H04L 27/36; H04L 27/38; H04L 5/0007;
(Continued)

(56) References Cited

U.S. PATENT DOCUMENTS 7,904,723 B2  3/2011  Shin
7,987,493 B1  7/2011  Reams
(Continued)

FOREIGN PATENT DOCUMENTS

CN  1487741 A  4/2004
WO  2018/230147 A1  12/2018

*Primary Examiner* — Khanh C Tran

(57) ABSTRACT

Various embodiments relate to a demodulator configured to receive a legacy signal and a secured signal using orthogonal frequency division multiplexing (OFDM) modulation, including: an analog to digital converter (ADC) configured to receive an OFDM modulated signal; an fast Fourier transform (FFT) unit configured to receive the output of the ADC; a frequency de-mapper configured to map the output of the FFT to legacy frame samples and secured signal samples including a secured hash; a sample to bit converter, a channel de-interleaver, and a channel decoder configured to process the legacy samples to produce a legacy frame; frame checking logic configured to check the validity of the legacy frame and produce a frame validity signal; a de-channelization module configured to convert the sample rate of secured signal samples; a channel decoder configured to decode the converted secured signal bits; a frame selector configured to select specific portions of the input legacy frame to produce a secured frame; a hash module configured to hash and encrypt the secured frame; a hash comparator configured to compare the received secured hash to the hashed and encrypted secured frame configured to produce a hash compare signal; and attack detection logic configured to determine when a received OFDM signal has been attacked based upon the hash compare signal.

15 Claims, 2 Drawing Sheets

(51) Int. Cl.
*H04L 9/06* (2006.01)
*H04L 25/03* (2006.01)

(58) Field of Classification Search
CPC ..... H04L 9/002; H04L 9/0643; H04L 9/3242; H04L 9/3297; H04W 12/106
See application file for complete search history.

(56) References Cited

U.S. PATENT DOCUMENTS

| | | |
|---|---|---|
| 2006/0136715 A1 | 6/2006 | Han et al. |
| 2009/0232234 A1 | 9/2009 | Du |
| 2011/0255620 A1* | 10/2011 | Jones, IV ................ H04L 69/22 375/260 |
| 2012/0315938 A1* | 12/2012 | Van Nee ............. H04B 7/0434 455/507 |
| 2019/0200278 A1 | 6/2019 | Ouzieli et al. |
| 2020/0257820 A1* | 8/2020 | Li ......................... G06F 21/604 |
| 2020/0358566 A1* | 11/2020 | Tomasoni ................ H04B 1/06 |

* cited by examiner

MODULATED SIGNATURE ADDED FOR ENHANCED AUTHENTICATION AND INTEGRITY LINK

CROSS-REFERENCE TO RELATED APPLICATIONS

This application claims priority under 35 U.S.C. § 119 to European Patent Application No. 19306018.3, filed on Aug. 15, 2019, the contents of which are incorporated by reference herein.

TECHNICAL FIELD

Various exemplary embodiments disclosed herein relate generally to an IQ modulated signature added to a communication channel to produce an enhanced authentication and integrity link.

BACKGROUND

Wireless technologies are now extensively deployed for applications where security is a major concern. Health or Automotive systems with advanced driver assistance systems (ADAS) capabilities are examples where communications have to work seamlessly and robustly.

Widespread radio standards used today still enhance their security as WPA for 802.11 standard. If some security enhancements rely on secured protocols exchanges, other technics, in the Physical layer for instance, may also be used limiting memory footprint or power consumption which is also required by IOT market and low power Edge devices. One of these technics may rely on adding a modulated signature to not only data frames but also to management or control frames.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

A modulator configured to transmit a legacy signal and a secured signal using orthogonal frequency division multiplexing (OFDM) modulation, including: a channel encoder, channel interleaver, and a bit to sample converter configured to process an input legacy frame to produce a plurality of legacy samples; a frame selector configured to select specific portions of the input legacy frame to produce a secured frame; a hash module configured to hash and encrypt the secured frame; a channel encoder configured to encode the hashed secured frame; a channelization module configured to spread the hash secured frame in order to match a bit rate of the plurality of legacy samples; a frequency mapper configured to map the input legacy frame samples and the channelized hashed secured frame to the frequency domain; an inverse fast Fourier transform (IFFT) module configured to receive the output of the frequency mapper; and digital to analog converter (DAC) configured to transmit the modulated signal from the IFFT.

The modulator of claim 1, wherein the secured frame further includes a transmit time stamp and wherein the transmit time stamp is combined with the hashed secured frame.

Various embodiments are described, wherein the channelization module is further configured to calculate the length of an orthogonal variable spreading factor (OVSF) and to generate OVSF codes.

Various embodiments are described, further comprising a phase rotator acting on the chips of the secured signal to spread this signal in the frequency domain in both I and Q.

Various embodiments are described, wherein the secured frame is mapped onto sub-carriers used by the legacy input frame.

Various embodiments are described, wherein the secured frame is mapped onto pilot sub-carriers on a possible subset of OFDM symbols.

Various embodiments are described, wherein the secured frame is modulated onto a quadrature channel of the pilot sub-carriers.

Various embodiments are described, wherein the secured frame is mapped onto unused sub-carriers at the edge of the frequency spectrum of the sub-carriers.

Further various embodiments relate to a demodulator configured to receive a legacy signal and a secured signal using orthogonal frequency division multiplexing (OFDM) modulation, comprising: an analog to digital converter (ADC) configured to receive an OFDM modulated signal; an fast Fourier transform (FFT) unit configured to receive the output of the ADC; a frequency de-mapper configured to map the output of the FFT to legacy frame samples and secured signal samples including a secured hash; a sample to bit converter, a channel de-interleaver, and a channel decoder configured to process the legacy samples to produce a legacy frame; frame checking logic configured to check the validity of the legacy frame and produce a frame validity signal; a de-channelization module, part of the de-spreading from an OVSF code spreading, configured to convert the sample rate of secured signal samples from chips to bits; a channel decoder configured to decode the converted secured signal bits; a frame selector configured to select specific portions of the input legacy frame to produce a secured frame; a hash module configured to hash and encrypt the secured frame; a hash comparator configured to compare the received secured hash to the hashed and encrypted secured frame configured to produce a hash compare signal; and attack detection logic configured to determine when a received OFDM signal has been attacked based upon the hash compare signal.

Various embodiments are described, wherein the secured samples further include a transmit time stamp and wherein the transmit time stamp is combined with the secured frame before the secured frame is hashed and encrypted.

Various embodiments are described, further comprising a time stamp comparator configured to compare the transmit time stamp and a receive time stamp and configured to produce a replay detect signal, wherein the attack detection logic determine when a received OFDM signal has been attacked further based upon the replay detect signal.

Various embodiments are described, wherein the secured samples are de-mapped from sub-carriers used by the legacy input frame.

Various embodiments are described, wherein the secured samples are de-mapped from pilot sub-carriers.

Various embodiments are described, wherein the secured samples are de-modulated from a quadrature channel of the pilot sub-carriers.

Various embodiments are described, wherein the secured samples are de-mapped from unused sub-carriers at the edge of the frequency spectrum of the sub-carriers.

Various embodiments are described, further including frame check logic configured to produce a frame check signal based upon the secured authentic signal and the frame validity signal.

Further various embodiments relate to a method of modulating a legacy signal and a secured signal using orthogonal frequency division multiplexing (OFDM) demodulation, including: channel encoding, channel interleaving, and bit to sample converting an input legacy frame to produce a plurality of legacy samples; selecting specific portions of the input legacy frame to produce a secured frame; hashing and encrypting the secured frame; channel encoding the hashed secured frame; spreading the hash secured frame in order to match a bit rate of the plurality of legacy samples; mapping the input legacy frame samples and the channelized hashed secured frame to the frequency domain; performing an inverse fast Fourier transform (IFFT) on the output of the mapping; and converting the digital output of the IFFT to an analog signal.

Various embodiments are described, wherein the secured frame further includes a transmit time stamp and wherein the transmit time stamp is combined with the hashed secured frame.

Various embodiments are described, wherein spreading the hash secured frame includes calculating the length of an orthogonal variable spreading factor (OVSF) and generating OVSF codes.

Various embodiments are described, wherein the secured frame is mapped onto sub-carriers used by the legacy input frame.

Various embodiments are described, wherein the secured frame is mapped onto pilot sub-carriers.

Various embodiments are described, wherein the secured frame is modulated onto a quadrature channel of the pilot sub-carriers.

Various embodiments are described, wherein the secured frame is mapped onto unused sub-carriers at the edge of the frequency spectrum of the sub-carriers limiting adjacent channel power ratio (ACPR).

Further various embodiments relate to a method of demodulating a legacy signal and a secured signal using orthogonal frequency division multiplexing (OFDM) demodulation, including: converting a received analog OFDM modulated signal to a digital signal; performing a fast Fourier transform (FFT) on the digital signal; de-mapping the output of the FFT to legacy frame samples and secured signal samples including a secured hash; converting received legacy frame samples to bits, channel de-interleaving the bits, decoding the de-interleaved bits to produce a legacy frame; checking the validity of the legacy frame and producing a frame validity signal; converting the sample rate of secured signal samples; decoding the converted secured signal samples; selecting specific portions of the input legacy frame to produce a secured frame; hashing and encrypting the secured frame; comparing the received secured hash to the hashed and encrypted secured frame to produce a hash compare signal; and determining when a received OFDM signal has been attacked based upon the hash compare signal.

Various embodiments are described, wherein the secured samples further include a transmit time stamp and wherein the transmit time stamp is combined with the secured frame before the secured frame is hashed and encrypted.

Various embodiments are described, further including comparing the transmit time stamp and a receive time stamp and producing a replay detect signal and determining when a received OFDM signal has been attacked further based upon the replay detect signal.

Various embodiments are described, wherein the secured samples are de-mapped from sub-carriers used by the legacy input frame.

Various embodiments are described, wherein the secured samples are de-mapped from pilot sub-carriers.

Various embodiments are described, wherein the secured samples are de-modulated from a quadrature channel of the pilot sub-carriers.

Various embodiments are described, wherein the secured samples are de-mapped from unused sub-carriers at the edge of the frequency spectrum of the sub-carriers.

Various embodiments are described, further including producing a frame check signal based upon the secured authentical signal and the frame validity signal.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
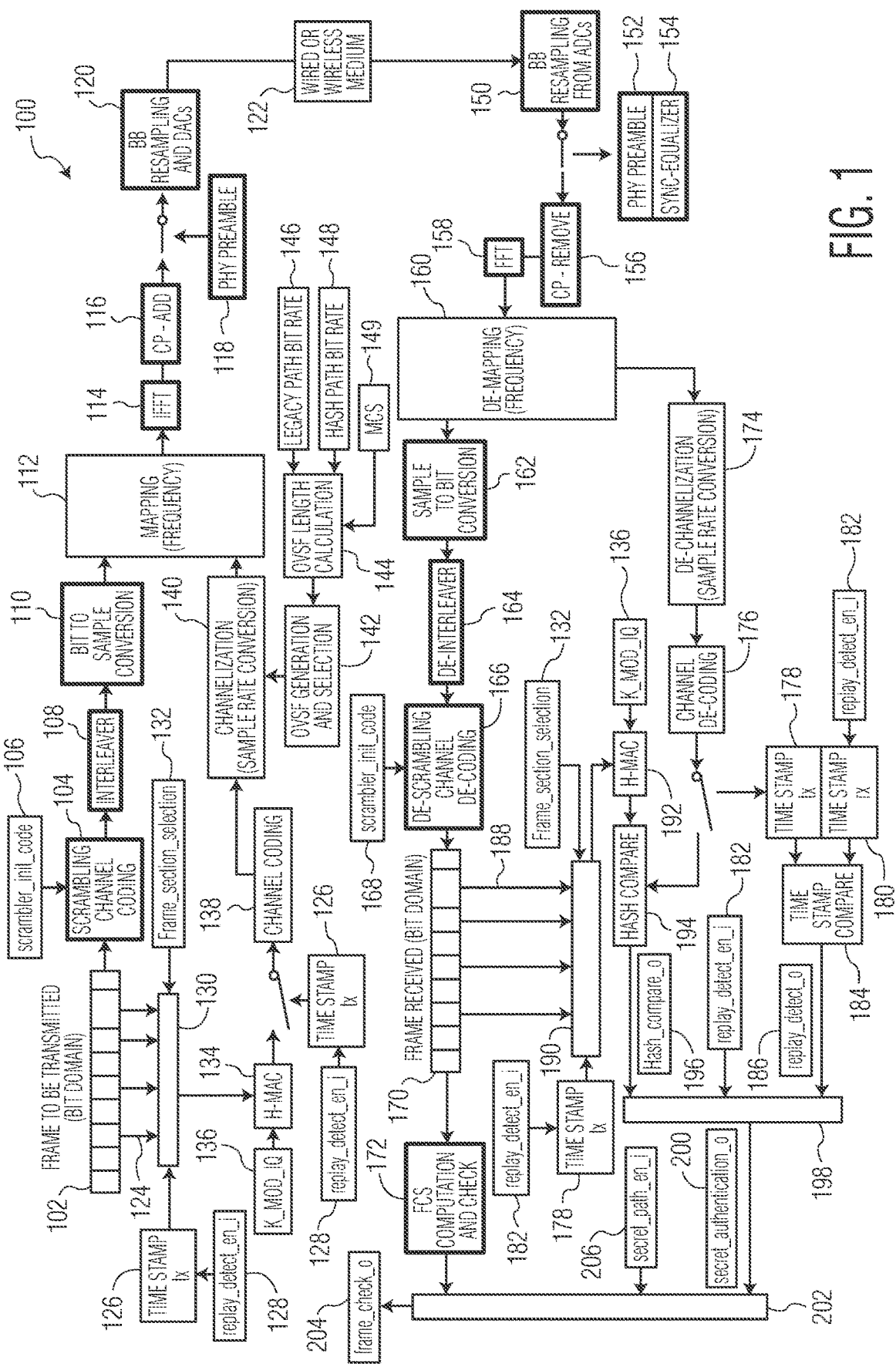
FIG. 1 illustrates an embodiment of a communication system using a secured frame.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

An embodiment of a communication system is described herein that provides a solution to strengthen the authentication or integrity process between two network entities. This system is applicable, but not limited to, to wired or wireless connection exchanges. A secret and secured symmetric key is supposed to be shared by these entities from either a shared pass phrase or from transport layer authentication exchanges, based on extensible authentication protocols (EAP) from asymmetric keys exchanges, or from a dedicated piece of silicon used as a root of trust. The key is used by the transmitter to produce a message authentication code (MAC) of the payload. This MAC may be modulated using a processing gain for samples/bit rate matching, for improved robustness, and for a possible steganography purpose. This secured signal and a legacy modulated packet signal are added keeping the capability for the legacy signal to be independently demodulated by legacy systems. The receiver demodulates both the legacy payload and the encrypted hash message. Decryption is then applied to the hash message using the symmetric key. The receiver finally hashes the legacy message received and compares the result with the decrypted hash message to authenticate the transmitter to provide a verification of the MAC. This system may be used for radio standards such as WiFi, Bluetooth low energy (BLE), Bluetooth (BT), ZIGBEE local area networks, wide area networks (WAN), and cellular networks. The term legacy as used herein refers to a communication protocol standard or communication protocol in wide use. It is intended that future protocols may be developed that become standards or become widely used, and these future protocols will be considered legacy protocols and systems as well.

The aim of the communication system is to integrate an additional modulated encrypted signal into a legacy signal that a receiver demodulates and de-crypts and compares with the received packet as an additional proof of authentication or integrity.

These enhanced authentication or integrity methods are implemented in the physical layer often designed in hardware where critical timings are engaged that makes software attacks of this scheme difficult. This communication system allows legacy terminals to continue to receive the legacy packets as their demodulators implicitly remove the added encrypted hash signal. This secured signal may be left detectable or hidden based upon processing gain codes applied on the hash signal.

The communication system described herein is applicable to multiple modulation schemes. Hereafter, implementation of the communication system is described through the example of 802.11.

FIG. 1 illustrates an embodiment of a communication system using a secured frame. The modulation process will first be described. The modulation process may be carried out by a modulator in a transmitter. The modulator includes a portion that implements the legacy portion of the communication system and a portion that implements the addition of the secured signal to the legacy signal. The legacy portions of the communication system are noted in FIG. 1 by boxes with a bold outline.

A frame 102 is modulated as defined by the radio standard for 802.11. That is bits of the frames 102 are scrambled by a scrambling channel encoder 104 using a scrambler initiation code 106. Next, an interleaver 108 interleaves the scrambled bits. The interleaved bits are converted to samples using a sample converter 110. The samples are then mapped into OFDM samples in the frequency domain by a mapper 112 and then time domain transformed through an IFFT processing unit 114 of either 64, 128, 256 or 1024 length. As an example, for 20 MHz high throughput protocol, called HT20, the output IFFT length is 64 samples long where the 16 latest samples (a cyclic prefix CP-ADD) are appended in front of the first sample 116 to form an 80 sample length OFDM symbol in the time domain. Finally, the PLPC preamble, referred below as the Phy Preamble 118, is added for synchronization, equalization and demodulation purpose. It is noted that the preamble may be the legacy preamble, but may be modified as well based upon the secured data stream using the frequency representation of the preamble. To keep SNR as high as possible to reach the best synchronization and equalization performances, these OFDM symbols may remain unchanged.

A Phy header may also be included along with the Phy Preamble 118. The legacy Phy header is always modulated with a robust MCS (BPSK modulation sharing packet information like MCS of the payload, length of the packet, . . . ), while the payload is modulated in BPSK, QPSK, 16QAM, 64QAM, 1024QAM. The OVSF length would be computed according to the MCS of the payload then, which may require a bigger processing gain if MCS QPSK, . . . 1024QAM are used. The communication system may also choose to not apply the secured signal on the header to improve header demodulation.

Then the symbol is baseband resampled and converted from a digital to an analog signal by a digital to analog converted (DAC) 120. This signal may then be transmitted along the wired or wireless medium 122 depending upon the specific application.

The communication system 100 also provides an additional secured signal added in the frequency domain (prior to the IFFT) to the legacy signal. Selected parts of the legacy frame bitstream 124 are added to a time stamp 126 to form a secured frame 130. The specific parts of the frame selected may be controlled by a frame selection parameter 132. Also, the use of the time stamp is optional (i.e., it may be omitted) and may be controlled by replay detect enable signal 128. To improve resilience to replay and other attacks, the secured frame 130 is hashed 134 and encrypted by a shared (symmetric encryption) key referred as K_MOD_IQ 136 to produce the MAC. Further, the time stamp 126 is added to the hashed secured frame if the addition of the time stamp is enabled 128. The secured bitstream is then channel encoded 138, and a channelization is performed 140 to match the sample rate of the legacy signal with an integer multiple of the sample rate of the secured signal at the input of the mapper 112. The channelizer 140 makes the IQ sample rate between legacy path and encrypted hash path equal. The bit rate of the hash output path is compared to the legacy bit rate following the channel coding and the number of bits per OFDM samples defined by the targeted MCS (Modulation Coding Scheme) 149 of the OFDM path. To adapt the bit rate, each bit out of the channel coding is spread by an orthogonal variable spreading factor (OVSF) code which makes the chip rate of the encrypted hash path equal to the sample rate of the legacy path after-sub-carrier mapping. An OVSF length calculation 144 is carried out based upon the legacy path sample rate 146 and the hash path bit rate 148. Then the OVSF code is generated and selected 142 based upon OVSF length calculation 144. This OVSF code is applied by the channelizer 140 to spread samples in the encrypted hash path. One OVSF among the set of OVSF codes defined by its OVSF length is applied and changed from OFDM symbol to OFDM symbol according to a predefined sequence. One chip over two of the OVSF code can be +/−90 degrees phase rotated whose sign is predefined by a known signature.

The secured signal is then added to a chosen sub-set of legacy sub-carriers during frequency mapping 112, which will be further described below. The IFFT transformation 114 is then applied to the sum of the two signals as well as the following steps as described above.

Now the demodulation process performed by the communication system 100 will be described. The demodulation process may be carried out by a receiver. First, the received symbol is run through an analog to digital converter (ADC) and baseband resampling is done 150. Next, the physical preamble 152 is removed. This physical preamble 152 may be used to preform packet detection, automatic gain control (AGC), channel synchronization, and channel estimation 154.

For each OFDM symbol, part of the cyclic prefix, 156 used to suppress inter-symbol interferences, is removed. The symbol length is then back to either 64, 128, 256 or 1024 sample length, and a FFT transformation is performed by an FFT unit 158 to return to the frequency domain where sub-carriers are equalized. The equalized IQ samples are fed into the de-mapper block 160 to recover the samples. The samples are then converted to a bit stream 162, the bit stream is de-interleaved by de-interleaver 164, and channel decoding is performed by the channel decoder 166 using the scrambler initiation code 168 to recover the original bitstream of the payload frame 170. Finally, a frame check sequence (FCS) is computed and checked by FCS logic 172 for the received frame 170. This path in the communication system corresponds to the legacy communication path.

The processing of the secured signal will now be described. Each IQ samples are first de-rotated according to the rotation defined above. The IQ samples corresponding are then gathered in subsets of consecutive IQ samples of length predefined by the OVSF code. Each subset of IQ samples is projected into the expected OVSF code attached to the index of the current OFDM symbol. The sign of the result of this projection is used to recover the bitstream of the secured path. The projection produces the de-channelization process 174. This operation is the inverse of the channelization 140 that occurs during the modulation process. Channel decoding is performed by a channel decoder 176 on the converted bits.

If replay detect is enabled based upon the replay detect enable signal 182, then the transmission time stamp 178 is removed from the decoded signal. Also, the receive time stamp 180 is captured and then compared by time stamp compare logic 184 to the transmit time stamp 178 to produce a replay detect signal 186. If the two transmit times are within a specified threshold value, then replay detect signal indicates that no replay attack is detected; otherwise if the threshold is exceeded than a replay attack is indicated. If the replay detect is not enabled, then these steps are not performed.

Next, parts 188 of the received legacy frame bitstream 170 are selected and combined with the received transmit timestamp 178 (if enabled) to form the received secured frame 190. This received secured frame 190 is hashed and encrypted 192 using the key K_MOD_IQ 192. The hash of the received secured frame is then compared to the received hash by hash compare logic 194 to produce a hash compare signal 196. The hash compare signal indicates if the computed hash and the received hash are equal. If the signal has been tampered with, then the hashes will not match indicating some sort of attack. Next, attack detection logic 198 receives the replay detect signal 186, the replay detect enable signal 182, and the hash compare signal 196 to determine if an attack has been indicated and produces the secured authentication signal 200. Finally, frame check logic 202 receives the FCS check output, a secured path enable signal 206 (that indicates that the secured path capability is enabled), and the secured authentication signal 200 to produce a frame check signal that indicates that the frame received is valid. This frame check signal utilizes the secured frame check in order to detect attacks on the communication system.

Figure 2:
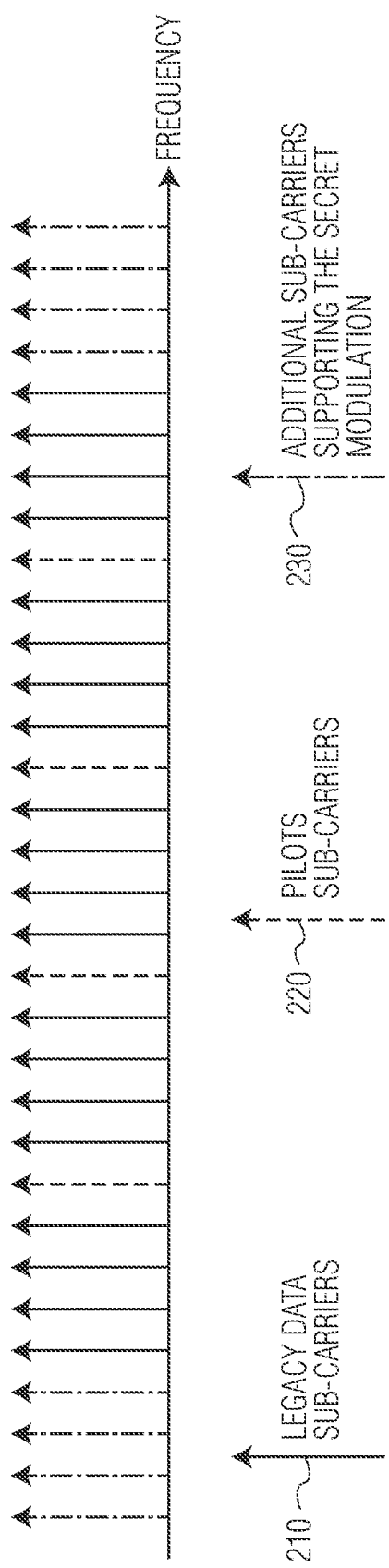
FIG. 2 illustrates the set of sub-carriers used by the OFDM modulation scheme.

The secured signal may be combined with the legacy signal in various ways. FIG. 2 illustrates the set of sub-carriers used by the OFDM modulation. In this case, four pilot sub-carriers 220 are shown. The number of pilot sub-carriers will depend upon the specific type of the OFDM channel bandwidth. 20 MHz legacy sub-carries 210 are shown. These are the sub-carriers used by the HT20 scheme as described herein. Also shown are 12 or 8 (802.11g or 802.11n) additional unused sub-carries 230 at the edges of the frequency spectrum that may be used exclusively by the secured signal, as they are currently unused. This leads to three different options for including the secured signal with the legacy signal that will be described below. While 52 sub-carriers with 4 pilot sub-carriers are show, other numbers of sub-carriers may be used as well.

Sub-carriers on the edge of the spectrum 230 or pilot sub-carriers 220 may be BPSK modulated to support the added secured signal in order to mitigate impact on the demodulation.

The spreading factor of the secured signal allows the secured signal to be set to a much lower power level then the legacy signal that results in a negative secured signal to legacy signal ratio. This signal may be added, when the pilot sub-carries 220 are in used, with a BPSK modulation on the quadrature (Q) path while the legacy signal remains in the in-phase (I) path. Common phase error tracking may be mitigated because the secured signal Q components are randomly distributed over the pilots. Another scheme would be to activate common phase error tracking only on pilots which have no secured modulation added in a given symbol or to activate a symbol time based common phase error tracking only if the OFDM symbol is not modulated by the secured message.

Alternatively, adding the secured signal on the sub-carriers 230 on the edge of the spectrum does not impact adjacent channel power ratio (ACPR) when a limited set of carriers are used, and once again, the processing gain of the secured signal allows the communication system to work with a low SNR for the secured signal that minimizes ACPR while, in this mode, interference with the legacy signal is reduced thanks to frequency multiplexing in the limit of the sinc power spectral density of sub-carriers.

Finally, the secured signal may also be added to the legacy data sub-carries 210 by mapping the samples of the secured signal onto the legacy sub-carriers 210 along with the legacy data. This may be accomplished by incorporating the additional data on the legacy sub-carries 210. Again, as the secured signal may be set to a lower power because of later processing gains, it will reduce interference with the legacy signal in this mode.

The signal transmitted, may be expressed by the following formulas at the IFFT output:

$$S(nTs)_{out} = S(nTs)_{secured} + S(nTs)_{legacy}$$

$$S(nTs)_{legacy} = \frac{1}{N}\sum_{i_D=1}^{D} a_{Legacy(i_D)} e^{\frac{j2\pi \times D_{array(i_D)} \times n}{N}} + \frac{1}{N}\sum_{i_p=1}^{P} a_{Legacy(i_p)} e^{\frac{j2\pi \times P_{array(i_p)} \times n}{N}}$$

Here, D is the number of legacy sub-carriers, $a_{Legacy(i_D)}$ are the sample values of the legacy signal modulated onto the legacy pilots, N is total number samples used for the IFFT and FFT, P is the number of pilot subcarriers, $a_{Legacy(i_p)}$ are the sample values of the legacy signal modulated onto the pilot sub-carriers, $i_D$ is the legacy sub-carrier index, and $i_P$ is the pilot sub-carrier index.

The table below illustrates the formulas transmitted secured signal for the three different modes described above.

| Modulation mode | Signal structure | Description |
|---|---|---|
| Legacy sub-carriers | $S(nTs)_{secured} = \frac{1}{\mu \times N} \sum_{i_D=1}^{D} a_{D\_array(i_D)} e^{\frac{j2\pi \times D_{array(i_D)} \times n}{N}}$ | In the legacy sub-carries mode the secured signal used the modulation coding scheme used by the legacy signal. In this case, the SNR required for demodulation is low which allows the application of the secured modulation on each legacy sub-carrier. The secured modulation has a processing gain allowing its demodulation with a low SNR requirement. Here $\mu$ is related to any processing gain associated with the secured signal. |
| Pilot sub-carriers | $S(nTs)_{secured} = \frac{1}{\mu \times N} \sum_{i_p=1}^{P} a_{P\_array(i_p)} e^{\frac{j2\pi \times P_{array(i_p)} \times n}{N}}$ | In this mode, the secured modulation is applied to the pilot subcarriers only. The secured signal may be added to the imaginary part of the pilots in the frequency domain to multiplex information since the 802.11 is not adding signal components on this axis. It may be added in other ways with other modulation schemes. |
| Edge sub-carriers | $S(nTs)_{secured} = \frac{1}{\mu \times N} \sum_{i_D=D+1}^{D+D'} a_{D\_array(i_D)} e^{\frac{j2\pi \times D_{array(i_D)} \times n}{N}}$ | In this mode, the secured modulation is applied on subcarriers on the edge of the spectrum. The amplitude of the subcarriers may possibly decrease with frequency index for an ACPR trade-off. The equalizer coefficients may either be assessed by adding the sub-carriers in the long training field (LTF) section of the preamble or equalization may be assessed by interpolation techniques. |

The following table describes how the communication system operates for various settings for the replay enable and secured path enable signals.

The determination of the shared symmetric keys between the two entities may be generated using various methods.

| Replay detect signal | Secured path enable signal | Description |
|---|---|---|
| 0 | 0 | Legacy modulation only |
| 0 | 1 | Legacy and secured modulation with time stamp management. A secured bit stream frame including a hash is produced based on a symmetric encryption using a shared secured key of a legacy frame. The bitstream is then modulated on the transmit path of the legacy signal. A receiver operating in these conditions can authenticate the frame received by comparing the hash produced by the received legacy frame, using the shared secured key, and the hash computed from the secured signal received. |
| 1 | 1 | Legacy and secured modulation with time stamp management. A secured bit stream frame including a hash is produced based on a symmetric encryption using a shared secured key of a legacy frame. The bitstream is then modulated on the transmit path of to the legacy signal. A time stamp is added into the secured path. A receiver operating in these conditions may authenticate the frame by comparing the hash produced by the legacy frame received, using the shared secured key, and the hash computed from the secured signal received. The time stamp appended in the secured signal is extracted and compared to the received time stamp to validate the received time stamp. If the computed time stamp difference between the transmit time stamp and the received time stamp is above a configurable (on hardware and/or software basis) threshold, the frame received is considered as a replay attack and rejected. |
| 1 | 0 | Legacy modulation only |

Any known method that may be used with the underlying communication protocol may be used.

Any attack that seeks to modify the frame of a transmitted frame will be detected, as the attacker will not be able to detect or modify the hash of the frame carried in the secured channel that is used authenticate the received frame. Further, if an attacker attempts to use a replay attack, the use of the timestamp in the hash of the frame will detect when this value is modified. Further, when the difference between the transmission time stamp of the frame and when the frame was received exceed a threshold value, a replay attack may be detected.

The modulation and demodulation paths described above are typically implemented in hardware on an integrated circuit. Depending upon the transmission rates involved and the complexity of the various parametric variations of the communication protocol implemented, the various hardware elements may be implemented as specific hardware circuits implementing the logic to carry out the functions. In other embodiments, parts of the modulation/demodulation process may be carried out using signal processors or other processors capable of carrying out the required functions. For example, the IFFT and FFT functions may be carried out using a special purpose signal processor that is programed to carry these functions. Such processors may have a parallel architecture in order to more quickly carry out the computations. As a result the various blocks of the modulation/demodulation system are implemented in hardware and for some functions may use various processing circuits controlled by computer instructions when such functions may require operation based upon various input parameters.

Various embodiments relate to a demodulator configured to receive a legacy signal and a secured signal using orthogonal frequency division multiplexing (OFDM) modulation, including: an analog to digital converter (ADC) configured to receive an OFDM modulated signal; an fast Fourier transform (FFT) unit configured to receive the output of the ADC; a frequency de-mapper configured to map the output of the FFT to legacy frame samples and secured signal samples including a secured hash; a sample to bit converter, a channel de-interleaver, and a channel decoder configured to process the legacy samples to produce a legacy frame; frame checking logic configured to check the validity of the legacy frame and produce a frame validity signal; a de-channelization module configured to convert the sample rate of secured signal samples; a channel decoder configured to decode the converted secured signal bits; a frame selector configured to select specific portions of the input legacy frame to produce a secured frame; a hash module configured to hash and encrypt the secured frame; a hash comparator configured to compare the received secured hash to the hashed and encrypted secured frame configured to produce a hash compare signal; and attack detection logic configured to determine when a received OFDM signal has been attacked based upon the hash compare signal.

The various embodiments described above provide a technical solution to the problem of authenticating the communication between two hardware systems. Many current communication protocols are susceptible to various attacks. The communications system disclosed herein uses a secured channel that carries an encrypted hash of portions of the transmit frame that then may be compared at the receiver to determine that authenticity of the received frame. Further, time stamp may be included in order to provide further ability to detect replay attacks. The use of this secured channel is added with the legacy channels in a way that does not affect the legacy communication. As a result, communication with legacy systems does not need to be changed, but communications systems that are capable of recognizing and processing the secured channel may be able to better resist attacks.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

The invention claimed is:

1. A modulator configured to transmit a legacy signal and a secured signal using orthogonal frequency division multiplexing (OFDM) modulation, comprising:
  a channel encoder, channel interleaver, and a bit to sample converter configured to process an input legacy frame to produce a plurality of legacy samples;
  a frame selector configured to select specific portions of the input legacy frame to produce a secured frame;
  a hash module configured to hash and encrypt the secured frame;
  a channel encoder configured to encode the hashed secured frame;
  a channelization module configured to spread the hash secured frame in order to match a bit rate of the plurality of legacy samples;
  a frequency mapper configured to map the input legacy frame samples and the channelized hashed secured frame to the frequency domain;
  an inverse fast Fourier transform (IFFT) module configured to receive the output of the frequency mapper; and
  digital to analog converter (DAC) configured to transmit the modulated signal from the IFFT.

2. The modulator of claim 1, wherein the secured frame further includes a transmit time stamp and wherein the transmit time stamp is combined with the hashed secured frame.

3. The modulator of claim 1, wherein the channelization module is further configured to calculate the length of an orthogonal variable spreading factor (OVSF) and to generate OVSF codes.

4. The modulator of claim 1, further comprising a phase rotator acting on the chips of the secured signal to spread this signal in the frequency domain in both I and Q.

5. The modulator of claim 1, wherein the secured frame is mapped onto sub-carriers used by the legacy input frame.

6. The modulator of claim 1, wherein the secured frame is mapped onto pilot sub-carriers on a possible subset of OFDM symbols.

7. The modulator of claim 6, wherein the secured frame is modulated onto a quadrature channel of the pilot sub-carriers.

8. The modulator of claim 1, wherein the secured frame is mapped onto unused sub-carriers at the edge of the frequency spectrum of the sub-carriers.

9. A demodulator configured to receive a legacy signal and a secured signal using orthogonal frequency division multiplexing (OFDM) modulation, comprising:
- an analog to digital converter (ADC) configured to receive an OFDM modulated signal;
- an fast Fourier transform (FFT) unit configured to receive the output of the ADC;
- a frequency de-mapper configured to map the output of the FFT to legacy frame samples and secured signal samples including a secured hash;
- a sample to bit converter, a channel de-interleaver, and a channel decoder configured to process the legacy samples to produce a legacy frame;
- frame checking logic configured to check the validity of the legacy frame and produce a frame validity signal;
- a de-channelization module, part of the de-spreading from an OVSF code spreading, configured to convert the sample rate of secured signal samples from chips to bits;
- a channel decoder configured to decode the converted secured signal bits;
- a frame selector configured to select specific portions of the input legacy frame to produce a secured frame;
- a hash module configured to hash and encrypt the secured frame;
- a hash comparator configured to compare the received secured hash to the hashed and encrypted secured frame configured to produce a hash compare signal; and
- attack detection logic configured to determine when a received OFDM signal has been attacked based upon the hash compare signal.

10. The demodulator of claim 9, wherein the secured samples further include a transmit time stamp and wherein the transmit time stamp is combined with the secured frame before the secured frame is hashed and encrypted.

11. The demodulator of claim 10, further comprising a time stamp comparator configured to compare the transmit time stamp and a receive time stamp and configured to produce a replay detect signal, wherein the attack detection logic determine when a received OFDM signal has been attacked further based upon the replay detect signal.

12. The demodulator of claim 9, wherein the secured samples are de-mapped from sub-carriers used by the legacy input frame.

13. The demodulator of claim 9, wherein the secured samples are de-mapped from pilot sub-carriers.

14. The demodulator of claim 9, wherein the secured samples are de-modulated from a quadrature channel of the pilot sub-carriers.

15. The demodulator of claim 9, wherein the secured samples are de-mapped from unused sub-carriers at the edge of the frequency spectrum of the sub-carriers.

\* \* \* \* \*